Nov. 11, 1952

W. V. JOHNSON 2,617,167

METHOD AND APPARATUS FOR EXTRUDING AND
BRIQUETTING COAL AND OTHER MATERIALS

Filed Oct. 31, 1950

INVENTOR.
Walter V. Johnson
BY Barnes, Kisselle, Laughlin & Raisch
Attorneys.

Nov. 11, 1952 W. V. JOHNSON 2,617,167
METHOD AND APPARATUS FOR EXTRUDING AND
BRIQUETTING COAL AND OTHER MATERIALS
Filed Oct. 31, 1950 4 Sheets-Sheet 2

INVENTOR.
Walter V. Johnson
BY
Barnes, Kisselle, Laughlin & Raisch
Attorneys.

Nov. 11, 1952   W. V. JOHNSON   2,617,167
METHOD AND APPARATUS FOR EXTRUDING AND
BRIQUETTING COAL AND OTHER MATERIALS
Filed Oct. 31, 1950   4 Sheets-Sheet 3

INVENTOR.
Walter V. Johnson
BY
Barnes, Kisselle, Laughlin & Raisch
Attorneys.

INVENTOR.
Walter V. Johnson

Patented Nov. 11, 1952

2,617,167

UNITED STATES PATENT OFFICE 2,617,167

METHOD AND APPARATUS FOR EXTRUDING AND BRIQUETTING COAL AND OTHER MATERIALS

Walter V. Johnson, Detroit, Mich.

Application October 31, 1950, Serial No. 193,185

10 Claims. (Cl. 25—14)

This invention relates to a method and apparatus of extruding materials and it has to do particularly with the extruding of agglomerate materials such as coal for forming the same into briquettes.

At the outset it may be stated that it is appreciated that plastic materials have heretofore been extruded and formed into bricks, briquettes or other shapes such, for example, as in the making of building bricks, tile and materials for the making of pottery and the like. These materials may be classified as being of a plastic nature, it being understood, of course, that the plastic materials are extruded and shaped while in a moist condition. Such materials are easily shaped and due to the plastic nature thereof some of them are quite fluid in the sense that the material can be caused to flow and a mass or segment of one plastic material may flow relative to an adjoining mass or segment. Of course, the plasticity may vary through quite a wide range in that, for example, the material for pottery is much more fluid or plastic than material for bricks.

I have discovered that relatively finely divided coal which has been moistened and agglomerated has characteristics wholly different from the clay materials in that an agglomerate mass of coal is not plastic, particularly in the sense that it does not possess the flowing or working characteristics of wetted clay materials used, for example, in the making of brick, tile or pottery. In this connection an agglomerate mass of coal having a moisture content within the range of that necessary for satisfactory extrusion is such that a segment of the compressed coal will not slide over another segment.

The coal particles of the mass must be moistened on their surfaces. Two little moisture results in a dryness which makes it increasingly difficult to slide the agglomerate mass over surfaces, while too much moisture interferes with the obtaining of an early green bond strength in the extruded aggregate and makes a vacuum seal impossible. Moreover, too much moisture will result in the inability to maintain a seal so that a vacuum can be drawn in a vacuum chamber as will later appear. In the performance of the process no appreciable amount of breakage of the individual particles can be countenanced inasmuch as dry surfaces are exposed when a particle of coal is broken and there will be no binder covering the surfaces, and such breakage results in the agglomerate mass becoming unduly dry or lacking in moisture. Accordingly, in the mechanism, structure is embodied so that the agglomerate mass may be extruded along smooth surfaces in which obstructions are minimized, for otherwise the agglomerate mass will pile up against an obstruction and cease to move.

In the process the divided coal is mixed with a suitable binder which may provide the requisite moisture or, in connection with which, additional water may be added, and the extruded agglomerate mass is passed into a chamber subjected to a reduced air pressure or vacuum for withdrawing the air from the mass. Inasmuch as the agglomerate mass is passed into the vacuum chamber and extruded from the vacuum chamber, the die construction is important from the standpoint of providing the seals and so that a vacuum may be maintained in the chamber, and also so that the agglomerate mass is so handled that the particles of coal are not broken or ruptured. In forming the extruded agglomerate mass which is to be cut into briquettes, it is desirable to provide longitudinally running grooves thereon. This is done by an improved die construction so constructed as to accommodate the characteristic in that the agglomerate mass will not, within reason, flow when subjected to pressure. Therefore, the final extruding die is so formed that the grooves are placed in the material before subjected to the final extruded pressure.

Other objects of the invention will be considered and the appreciation thereof realized as the detailed description is considered in conjunction with the accompanying drawings.

Figure 1:
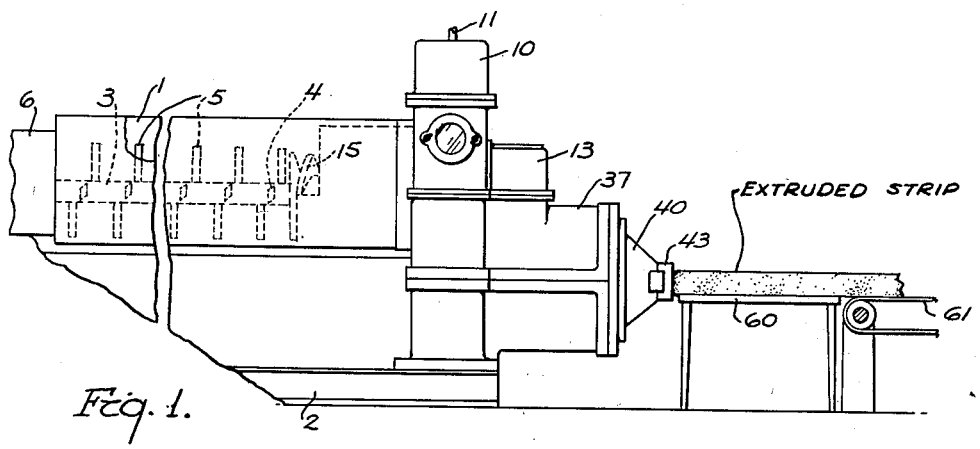
Fig. 1 is a side elevational view showing a machine constructed in accordance with the invention with some parts cut away.
Figure 2:
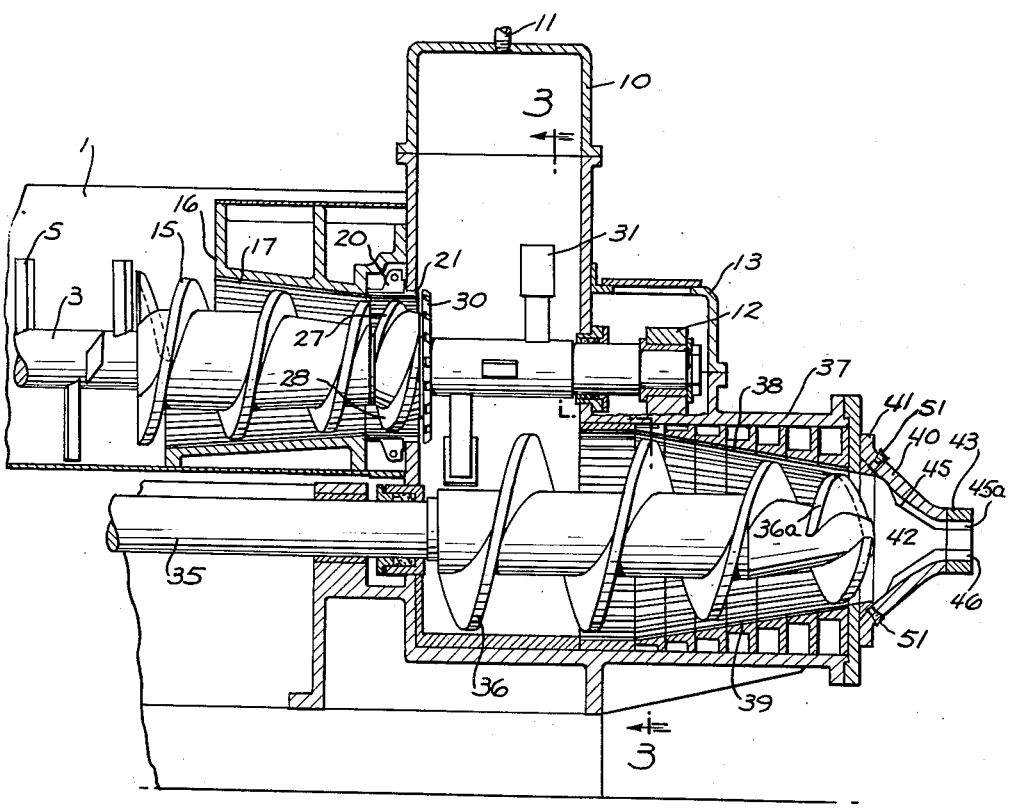
Fig. 2 is an enlarged cross sectional view taken through the vacuum chamber and showing the sealing die, the extrusion die, and the extruding auger.
Figure 3:
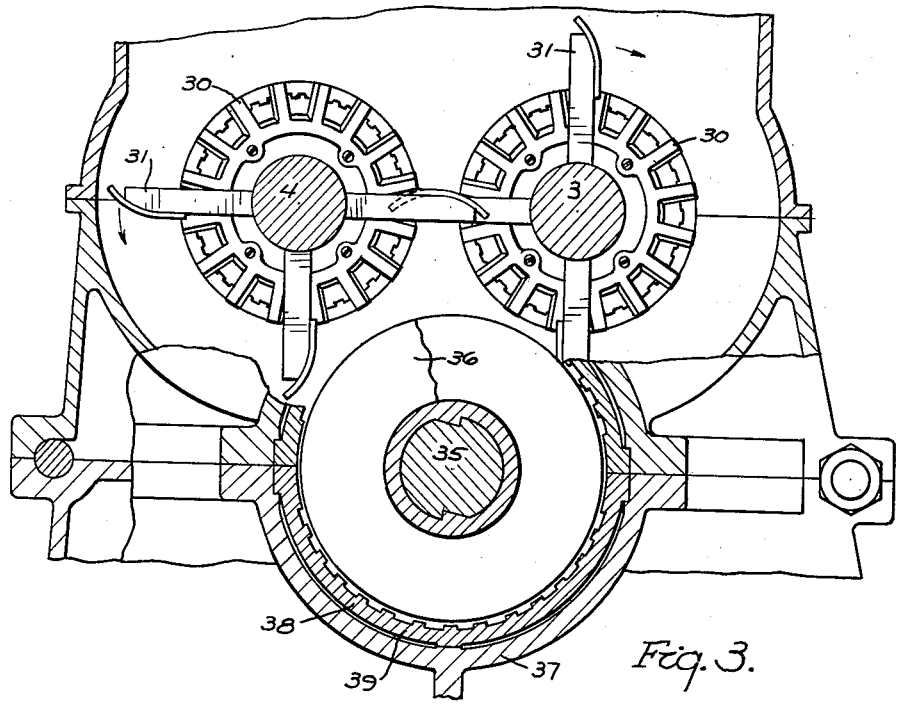
Fig. 3 is a cross sectional view taken substantially on line 3—3 of Fig. 2 showing parts in the interior of the vacuum chamber.

The apparatus employed in this invention is an extruding machine of the general type disclosed in the F. T. Buzard Patent No. 2,276,261 of March 10, 1942. As illustrated in Fig. 1, the apparatus has a container 1 open at the top for receiving the material and the apparatus may rest upon a suitable base 2. The container 1 with its interior operating parts constitutes a pug mill. The moisture is preferably introduced into the material in the pug mill. This may be done by adding water or by delivering steam in the material. Extending lengthwise through the container are two shafts 3 and 4 each provided with a series of knives or arms 5. These shafts rotate in opposite directions, as shown by the arrows in Fig. 3, and the material placed in the container is subjected to a mixing action. It will be noted that, as Fig. 3 is viewed, the two shafts rotate in the opposite directions and that the arms move downwardly along the outside walls of the container and inwardly toward the center and then upwardly in the central portion of the container. This is particularly important in connection with the arms or knives in the vacuum chamber as will presently appear. This part of the pug mill may follow essentially the construction shown in the Buzard patent and further detailed description is not necessary herein. Suitable driving means are embodied in the housing at 6. At one end of the container is a vacuum chamber generally illustrated at 10, which is connected as by means of a conduit 11 to pump means (not shown) for drawing a vacuum in the chamber. The agglomerate is moved from left to right as Fig. 2 is viewed from the container 1 through the vacuum chamber and then out through the final extruding die. The shafts 3 and 4 extend through the vacuum chamber and are journalled at their ends as indicated at 12, the journals advantageously being within a portion 13 of the housing.

On each of the shafts 3 and 4 is an auger or screw 15 arranged to operate in a hollow guide 16 for urging the agglomerate mass through the guide. The interior of the guide 16 is of grooved formation as shown at 17 constituted by alternately arranged grooves and ridges. There is a sealing die at the intersection of the end of the guide 16 and the vacuum chamber through which the material is moved in such a manner as to provide a seal so that a reduced pressure may be maintained in the vacuum chamber.

Figure 7:
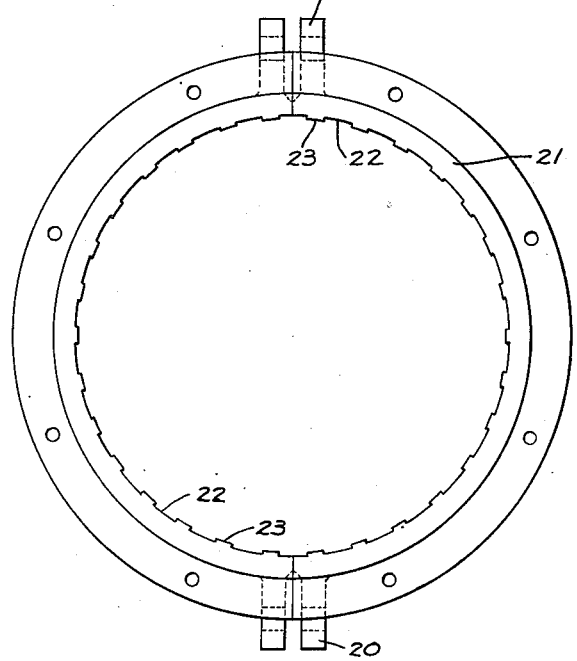
Fig. 7 is a view illustrating the die at the intake of the vacuum chamber.
Figure 8:
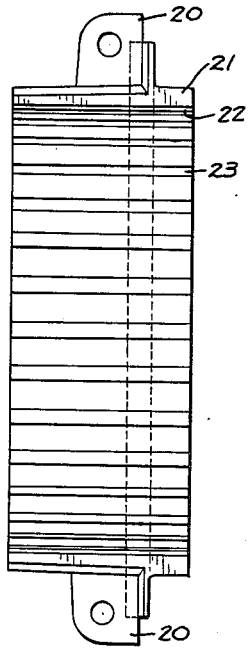
Fig. 8 is a view showing one-half of the die illustrated in Fig. 7.
Figure 9:
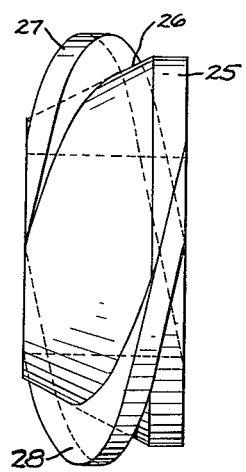
Fig. 9 is a view of the die core at the intake of the vacuum chamber.

The die is advantageously made of two parts, as shown in Fig. 7 for ease of assembly, the parts being secured together by bolts passing through ears 20. The die has a circumferential wall 21, the inner face of which is cylindrical or substantially cylindrical. The point is that there is no substantial taper or reduction in cross sectional area. The interior face of the die is fluted or splined with alternate recesses 22 and projections 23 and the projections and recesses register with those of the guide 16. This die, of course, is held fixed against rotation. Mounted on the shaft so as to lie within the die is a core as shown in Fig. 9. This core has a body 25 of frusto-conical form thus having a tapered surface 26 and it has a helix or flight thereon. Preferably, the helix on the intake core die is double, there being one flight 27 and another flight 28. This provides a balanced thrust. Due to the frusto-conical shape of the core the height of the helical flights vary axially of the core while, of course, the outside diameter is constant.

This core sits within the die as shown in Fig. 2 and the peripheral edge of the two flights 27 and 28 have nice working clearances with respect to the projections 23 in the die. Note also that the helix or auger 15 terminates in close proximity to the die 21. This is an essential arrangement so as to leave no pocket or space in which some of the agglomerate may lodge. It is sufficient if the flight 15 comes into adequate proximity to the die 21 although it may be spaced slightly therefrom or may enter the die a short distance. The preferred arrangement is to have the flight 15 terminate substantially at the entrance of the die 21, and the term "substantially" is used to cover situations where the flight may enter the die somewhat or may be so slightly spaced therefrom as to provide no pocket where the agglomerate may lodge.

Just within the vacuum chamber and adjacent the outlet of the die 21 is a shredder mounted on each shaft. Each shredder has projecting arms 30 which break up the agglomerate as it is forced into the vacuum chamber. Mounted on each of the shafts 3 and 4 are feeder knives or blades 31. These, of course, rotate with the shafts 3 and 4 and feed the material, which has been again broken into small particles or masses by the shredders 30, downwardly and to the final extruding auger.

There is a driving shaft 35 journalled in the machine as indicated in Fig. 2 which underlies the two shafts 3 and 4 and upon which the extruding auger flight 36 is mounted. The outlet from the vacuum chamber is generally indicated at 37 and is provided with a sectional internal liner 38. The internal surfaces of the liner are of grooved construction as indicated at 39 constituted by alternately arranged recesses and ridges. The extreme end of the extruding auger is preferably provided with a double helix or flight, the added flight being indicated at 36a. The number and shape of the ribs may be varied to produce different extruded shapes.

Figure 10:
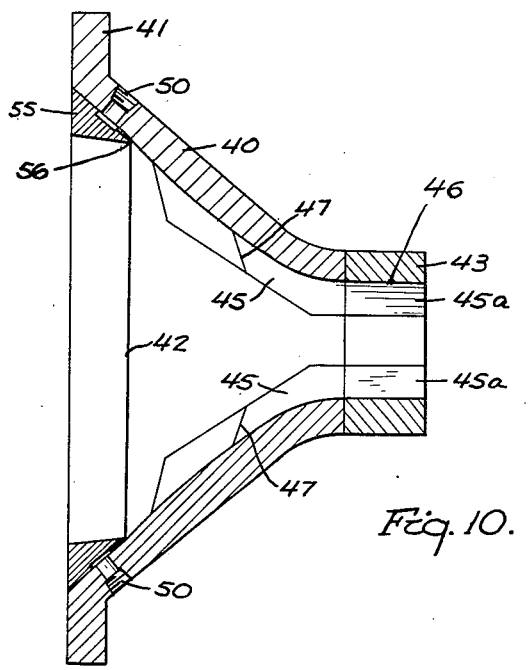
Fig. 10 is an enlarged cross sectional view of the final die body and die mouth piece.

The die body is illustrated at 40 and it is arranged to be bolted to the outlet 37 as by means of its flange 41. The walls of this die are of tapering form as shown in Fig. 10 so that the passage 42 defined thereby gradually decreases so that as the coal is forced therethrough it is compacted. A final die mouth which may be a separate element is indicated at 43 and it is arranged to be bolted into position at the end of the die 40. In order to provide grooves in the extruded material the tapered walls of the die 40 are provided with ribs 45 and the die mouth is provided with registering ribs 45a. It is important to note that these ribs extend well into the location in the die 40 where it is of large die dimensions. The ribs 45 have a sharp leading edge and gradually increase in cross sectional dimensions from the leading edge to their intermediate portion indicated at the line 47 where the ribs attain their maximum cross dimension. The ribs 40 and 45a each, in effect, constitutes a single rib and the die mouth has an internal shape corresponding to the shape to be given to the extruded material. The flights 36 and 36a are disposed as far forwardly as possible and preferably extend into the die 40. The interior walls of the die mouth, as indicated at 46, are parallel in the sense they are not tapered or constricting and the ribs 45a are likewise parallel. This is an important construction as will presently be seen.

Figure 4:
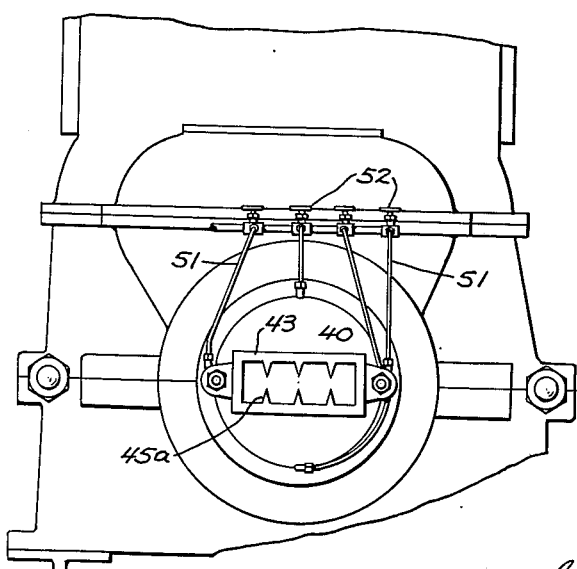
Fig. 4 is an elevational view looking at the outlet end of the device and illustrating the final extrusion die.

For the purpose of providing adequate lubricant, the die 40 is provided with tapped apertures 50 for the reception of fittings for pipes or conduits 51 for supplying water to the die as may be controlled as desired by suitable valve means. As indicated in Fig. 4, each conduit 51 is provided with a controlling valve 52. This valve means is subject to variation and the number of conduits leading to the die may vary as needed. There is a distributor ring 55 within the die, cut away for providing a circumferential chamber or passage 56 which underlies the apertures 50. The water flows into the chamber 56 and thus may be distributed throughout 360°. The inner surface of the distributor ring provides a die surface. The flights 36 and 36a extend into this distributor ring and terminate just slightly upstream from the circumferential of the passage 56.

Figure 5:
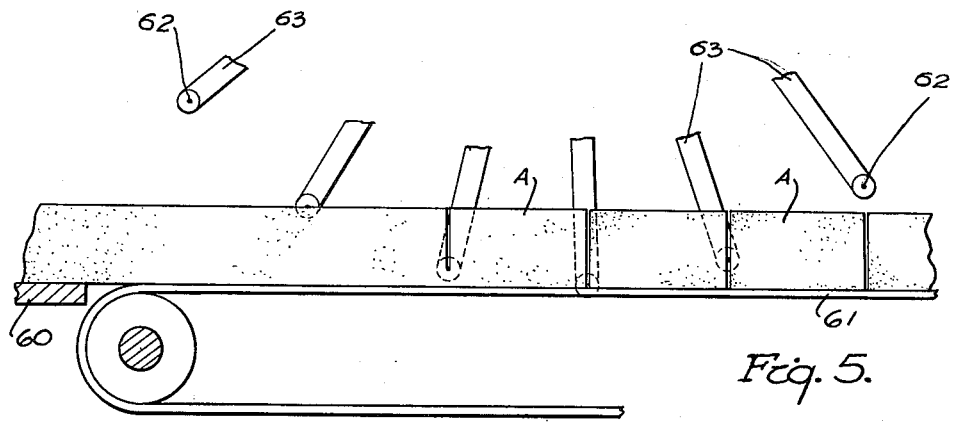
Fig. 5 is a diagrammatic view illustrating how the extruded length of agglomerate is made or cut into briquettes.
Figure 6:
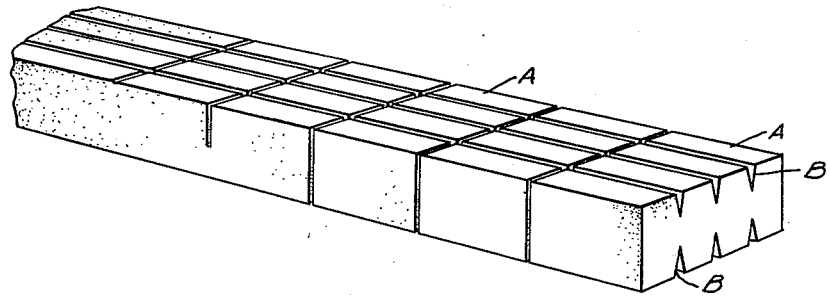
Fig. 6 is a perspective view illustrating the extruded strip of material.

In the disclosure made herein the material is extruded in strip form as shown in Fig. 6, and the strip is cut into briquettes. A briquette is shown at A and has grooves B formed therein. As shown in Fig. 5 the material may be extruded onto a platform or support 60 and then may move into a conveyor belt 61. As it moves the strip is cut into briquettes by a cutting machine which is known to those versed in the art. Such a machine is diagrammatically illustrated as having cutting wires 62 each mounted on a movable arm 63 and as the length of material moves from left to right the cutting wire is forced through the material to cut the same, the wire moving uniformly with the material as the cut is being made.

As before mentioned, the coal with its binder is placed in the container 1. The binder used may vary. It may be wheat flour, corn starch, any other starch material, tar, pitch, asphalt, or the like. A low grade wheat flour serves as an excellent binder. The agglomerate mass is forced through the sealing die 21 and there is substantially no compacting or compressing of the material. The sealing die is substantially cylindrical in internal shape and, accordingly, its cross sectional dimensions are uniform from end to end. The grooved formation keys the mass of material to prevent it from rotating so that the material may be pushed through the die. Also, the coal particles are not broken because of the smooth walls and lack of pockets or obstructions. This is important because each particle substantially must be coated or covered with moisture or binding material and if a substantial number of particles are broken the exposed surfaces quickly acquire the moisture drawing the same from the wetted surfaces and the mixture becomes too dry and will not properly pass through the die with a reasonable amount of power. The movement of the material through the sealing die is uniform and steady as produced by the flights 27 in the die. This is to distinguish over a surging situation of alternate build-up and release, which would occur if the differential pressure caused chunks of the material to break off and to be drawn into the vacuum chamber, which action would break the seal.

The moisture content must not be below that which makes the mass capable of being handled and extruded nor must it be higher than that at which an early green bond strength of the briquettes can be obtained. Generally speaking, the moisture content varies with the type and size of coal but the moisture content by weight should, it is believed, be between 17% and 26% by weight. Also, the condition prevailing in the sealing die must be such as to provide a seal for the drawing a suitable vacuum in the de-airing chamber 10. With the present invention a vacuum as high as 27" of mercury can be maintained.

Another important factor is that the moisture content must not be squeezed, so to speak, or caused to flow either forwardly or backwardly from the sealing die. If it is squeezed forwardly, the de-airing chamber may become flooded with excess moisture; if it is squeezed backwardly the excess moisture then lies in the mixing chamber. Accordingly, the sealing die and its die core is arranged as stated so that the agglomerate mass, while being packed in the die to hold the requisite vacuum, the moisture is not forced forwardly or rearwardly nor are the coal particles broken or ruptured to render the mass too dry. Moreover, the arrangement of the die is such that moisture is not squeezed from the radially inner strata of the material toward or to the radially outer strata of the material. Thus, the moisture content of the material in the die remains substantially uniform throughout the cross sectional area thereof.

When pieces are broken, there is a weak structure in the ultimate briquette because of lack of binding material thereon, in addition to the fact that dry surfaces are objectionable because of their resistance to slide over the surfaces in the machine. Although some of the material becomes pocketed in the internal grooves of the sealing die, the material engaged by the helix may be moved through the die apparently due to the fact that the flights of the core exert a shearing action, thus shearing the material engaged by the flights from the material pocketed in the grooves. This is an apparent exception to the rule that a segment of the agglomerate mass will not flow over another segment thereof.

In the de-airing chamber the material is again broken up as above stated, and the feeding knives or arms 31 aid in feeding the material downwardly into the helical formation of the extruding auger. The direction of rotation of the feeding knives is important. It will be noted by reference to Fig. 3 that the feeding arms wipe downwardly along the interior surfaces of the walls of the vacuum chamber and thus feed the material downwardly and toward the center of the vacuum chamber wherein lies the extruding auger. Of course, the feeding arms in the pug mill rotate in the same direction. This is particularly important in the vacuum chamber as the arms wipe downwardly along the walls of the chamber thus preventing the piling up of or the accumulation of material along the outer walls of the container and better feeding of the material to the extrusion auger. The direction of rotation of the mixing arms in the pug mill moves the material toward the central bottom portion of the container. This provides for a uniform condition in the two sealing dies and a more efficient mixing. Heretofore, with the mixing arms in the pug mill operating in the opposite direction, sometimes the material in one sealing die would contain too much moisture while the material in the other sealing die might have satisfactory moisture or might even be too dry.

The material is extruded from left to right by the flight 36 of the extrusion auger and then into the die 40. The double flight on the end of the auger establishes a balanced thrust condition and the material is compressed by the tapered form of the extrusion die. If the forces required become too great, lubricant in the form of water, may be added by the conduits as shown and this may be controlled as desired as the material may vary from time to time and may vary with different types of coals. It is to be noted particularly that the ribs 45 have their leading edges well within the tapered die where the die is of substantial cross dimensions. Thus the grooves formed in the material are placed therein before the agglomerate mass is substantially compressed. In other words, the leading edges of the ribs form the grooves, and thereafter, the grooves are merely maintained as the material is forced through the die and is gradually compacted and then is forced out through the die mouth. The ribs 45a in the die mouth are, in effect, continuations of the ribs 45 and thus maintain the grooves. The agglomerate mass could not be thus grooved by ribs in the die mouth only since the mass is under compression and it does not have the elasticity or flowing qualities sufficient to form a groove in it at that time.

In practicing the method, the size of the coal particles may be varied to some extent but one satisfactory application is that where the largest particle size was about ⅛ of an inch. Another important factor is the drawing of the air from the material in the de-airing chamber. If the material is not de-aired the resultant extruded mass of coal is of an unstable crumbly nature. It has little capabilities of maintaining its geometric shape. When the material is de-aired, the extruded agglomerate is compact and hard and of a rubber consistency that cannot readily be broken, torn apart or distorted, and can be handled with great facility with the individual briquettes showing a remarkable ability to maintain their geometric shape. Of course, after the extruded briquettes have been thus formed they are subjected to suitable drying action. For purposes of speed the briquettes may be dried in a suitable oven or kiln, although it has been found that the briquettes may be dried by exposure to the atmosphere although this takes a longer time. The finished briquette, following the drying, is a hard solid mass, burns efficiently from the outside inwardly and burns with practically a total absence of smoke as no unburned gas or material is released. The grooves formed in the briquette afford a vent for the escape of moisture once the product is wrapped and piled and also affords better burning action by breaking into individual pieces and exposing more burning surface. The final briquette product may, of course, be of any desired size but a briquette of satisfactory size has been made having a dimension of about 9½" measured crosswise of the grooves, about 3½" thick and about 7" measured lengthwise of the grooves and having a weight of about 11½ pounds. The briquettes may be suitably packaged as by being wrapped in paper and handled, sold and used in packaged manner. In some cases the briquettes may be sold without being packaged or wrapped.

I claim:

1. The method of forming briquettes from a moistened agglomerate mass of divided coal and a binder which comprises, breaking up the material, subjecting the material to a vacuum while in broken up form to withdraw air therefrom, forcing the material through a die or compress with same and with continuous unbroken action, forming grooves in the material before it is compressed by and passed through the die, maintaining the grooves as the material passes through and is compressed by the die, whereby to provide an extruded endless length of material with lengthwise running grooves therein and then cutting the material transversely into briquettes.

2. In an apparatus for handling a moist agglomerate mass of material comprising divided coal and a binder which comprises in combination, a mixing chamber for the material, a vacuum chamber, a die between the mixing chamber and the vacuum chamber having a circular opening therein of substantially uniform diameter throughout its axial extent and having its internal surface grooved axially, the grooves being straight and of uniform cross dimensions from end to end, a rotary shaft extending to the die axially thereof, and auger means having a helical flight thereon for forcing the material through the die and into the vacuum chamber, said helical flight terminating substantially at the entrance end of the die.

3. In an apparatus for handling a moist agglomerate mass of material comprising divided coal and a binder which comprises in combination, a mixing chamber for the material, a vacuum chamber, a die between the mixing chamber and the vacuum chamber having a circular opening therein of substantially uniform diameter throughout its axial extent, a rotary shaft in the mixing chamber and extending into the die, auger means having a helical flight on said shaft for forcing material to the die, the said flight terminating substantially at the entrance end of the die, a die core on the shaft positioned in the die, and having two oppositely arranged helical flights thereon, the outer edges of which have a working clearance with the internal face of the die for forcing the material through the die.

4. In an apparatus for handling a moist agglomerate mass of material comprising divided coal and a binder which comprises in combination, a mixing chamber for the material, a vacuum chamber, a die between the mixing chamber and the vacuum chamber having a circular opening therein of substantially uniform diameter throughout its axial extent, a rotary shaft in the mixing chamber and extending into the die, auger means having a helical flight on said shaft for forcing material to the die, the said flight terminating substantially at the entrance end of the die, a die core on the shaft positioned in the die, and having two oppositely arranged helical flights thereon, the outer edges of which have a working clearance with the internal face of the die for forcing the material through the die, said die core having a body of frusto-conical shape positioned so that the core increases in cross dimension in the direction of flow of the material through the die, and the two helical flights having a greater height near the entrance end of the die than near the outlet end of the die.

5. In an apparatus for extruding a moist agglomerate mass of material comprising, a divided coal and a binder which comprises in combination, a chamber having means for breaking up the material into an unpacked mass, an outlet opening in the chamber serving to confine material passing therethrough, a rotary shaft, auger means on the shaft having a helical flight positioned in the outlet means for moving material therethrough, a die secured in position at the outlet through which the material is extruded by the auger, said die being of tapered form internally so that it decreases in internal cross dimensions in the direction of flow of the material and having a die mouth at its outlet end, and internal ribs in the die extending from a location where the die has a relatively large cross sectional dimension, whereby to form grooves in the material before the extruded material is tightly compacted, said ribs extending along the tapered walls of the die and through the die mouth, whereby the portions of the ribs in the die mouth maintain the grooves in the extruded material.

6. In an apparatus for extruding a moist agglomerate mass of material comprising, a divided coal and a binder which comprises in combination, a chamber having means for breaking up the material into an unpacked mass, an outlet opening in the chamber serving to confine material passing therethrough, a rotary shaft, auger means on the shaft having a helical flight positioned in the outlet means for moving material therethrough, a die secured in position at the outlet through which the material is extruded by the auger, said die being of tapered form internally so that it decreases in internal cross dimensions in the direction of flow of the material and having a die mouth at its outlet end, and internal ribs in the die extending from a location where the die has a relatively large cross sectional dimension, whereby to form grooves in the material before the extruded material is tightly compacted, said ribs extending along the tapered walls of the die and through the die mouth, whereby the portions of the ribs in the die mouth maintain the grooves in the extruded material, said die mouth being substantially of uniform cross dimensions from its entrance end to its outlet end.

7. In an apparatus for extruding a moist agglomerate mass of material comprising, a divided coal and a binder which comprises in combination, a chamber having means for breaking up the material into an unpacked mass, an outlet opening in the chamber serving to confine material passing therethrough, a rotary shaft, auger means on the shaft having a helical flight positioned in the outlet means for moving material therethrough, a die secured in position at the outlet through which the material is extruded by the auger, said die being of tapered form internally so that it decreases in internal cross dimensions in the direction of flow of the material and having a die mouth at its outlet end, and internal ribs in the die extending from a location where the die has a relatively large cross sectional dimension, whereby to form grooves in the material before the extruded material is tightly compacted, said ribs extending along the tapered walls of the die and through the die mouth, whereby the portions of the ribs in the die mouth maintain the grooves in the extruded material, said auger means having two helical flights adjacent its end with the two flights positioned substantially oppositely.

8. In an apparatus for extruding a moist agglomerate mass of material comprising, divided coal and a binder which comprises in combination, a chamber having means for breaking up the material into an unpacked mass, an outlet opening in the chamber serving to confine material passing therethrough, a rotary shaft, auger means on the shaft having a helical flight positioned in the outlet means for moving material therethrough, a die secured in position at the outlet through which the material is extruded by the auger, said die being of tapered form internally so that it decreases in internal cross dimensions in the direction of flow of the material and having a die mouth at its outlet end, and internal ribs of substantially uniform height from end to end in the die extending from a location where the die has a relatively large cross sectional dimension, whereby to form grooves in the material before the extruded material is tightly compacted, said ribs extending along the tapered walls of the die and through the die mouth, whereby the portions of the ribs in the die mouth maintain the grooves in the extruded material.

9. In an apparatus for handling a mass of moist material which comprises, in combination, a mixing chamber, a vacuum chamber, a die between the mixing chamber and the vacuum chamber having a circular opening therein of substantially uniform diameter throughout its axial extent, a rotary shaft, auger means having a helical flight thereon for forcing the material to the die, said helical flight terminating substantially at the entrance end of the die, a die core in the die with a helical flight thereon for forcing the material through the die and into the vacuum chamber, means for drawing a vacuum in the chamber, means in the vacuum chamber for breaking up the material, said vacuum chamber having an outlet passage, an extrusion die at the outlet end of the passage, a rotary shaft having a helical flight thereon for forcing the material through the extrusion die, said extrusion die being of tapered form internally with its cross dimensions decreasing in the direction of flow of the material and having a die mouth, whereby the material is compressed as it is extruded through the extrusion die, and internal ribs on the interior walls of the die and die mouth of substantially uniform height, said ribs having their leading ends in a part of the extrusion die of large internal diameter, whereby to groove the material before the same is substantially compressed, and said ribs maintaining the grooves as the material is compressed and forced out through the die mouth.

10. In an apparatus for extruding a mass of moist material which comprises in combination, a chamber having means for breaking up the material into an unpacked mass, an outlet opening in the chamber serving to confine material passing therethrough, a rotary shaft, auger means on the shaft having a helical flight positioned in the outlet means for moving material therethrough, a die secured in position at the outlet through which the material is extruded by the auger, said die being of tapered form internally so that it decreases in internal cross dimensions in the direction of flow of the material and having a die mouth at its outlet end, and internal ribs in the die extending from a location where the die has a relatively large cross sectional dimension, whereby to form grooves in the material before the extruded material is tightly compacted, said ribs extending along the tapered walls of the die and through the die mouth, whereby the portions of the ribs in the die mouth maintain the grooves in the extruded material.

WALTER V. JOHNSON.

REFERENCES CITED

The following references are of record in the file of this patent:

UNITED STATES PATENTS

| Number | Name | Date |
| --- | --- | --- |
| 275,467 | Chambers, Jr. | Apr. 10, 1883 |
| 551,306 | Converse et al. | Dec. 10, 1895 |
| 1,614,526 | Lambie et al. | Jan. 18, 1927 |
| 1,987,359 | Brown | Jan. 8, 1935 |
| 2,078,565 | Durst et al. | Apr. 27, 1937 |
| 2,276,261 | Buzard | Mar. 10, 1942 |